United States Patent
Sabban

(10) Patent No.: US 12,551,533 B2
(45) Date of Patent: Feb. 17, 2026

(54) INTRANASAL NEUROPEPTIDES FOR USE IN STRESS-RELATED IMPAIRMENTS

(71) Applicant: New York Medical College, Valhalla, NY (US)

(72) Inventor: Esther L. Sabban, Bronx, NY (US)

(73) Assignee: NEW YORK MEDICAL COLLEGE, Valhalla, NY (US)

( * ) Notice: Subject to any disclaimer, the term of this patent is extended or adjusted under 35 U.S.C. 154(b) by 0 days.

(21) Appl. No.: 17/440,445

(22) PCT Filed: Mar. 18, 2020

(86) PCT No.: PCT/US2020/023259
§ 371 (c)(1),
(2) Date: Sep. 17, 2021

(87) PCT Pub. No.: WO2020/190997
PCT Pub. Date: Sep. 24, 2020

(65) Prior Publication Data
US 2022/0143147 A1 May 12, 2022

Related U.S. Application Data

(60) Provisional application No. 62/819,820, filed on Mar. 18, 2019.

(51) Int. Cl.
*A61K 38/22* (2006.01)
*A61K 9/00* (2006.01)
*A61P 25/00* (2006.01)
*A61P 25/24* (2006.01)

(52) U.S. Cl.
CPC ........ *A61K 38/2271* (2013.01); *A61K 9/0043* (2013.01); *A61K 9/0073* (2013.01)

(58) Field of Classification Search
CPC .............. A61K 38/2271; A61K 9/0043; A61K 9/0073; A61K 38/22; A61P 25/00; A61P 25/24
See application file for complete search history.

(56) References Cited

U.S. PATENT DOCUMENTS

| | | |
|---|---|---|
| 3,941,763 A | 3/1976 | Sarantakis |
| 2016/0106808 A1 | 4/2016 | Charney et al. |

OTHER PUBLICATIONS

Rylkova et al, "Effects of NPY and the specific Y1 receptor agonist [D-His26]-NPY on the deficit in brain reward function and somatic signs associated with nicotine withdrawal in rats," Neuropeptides, Jun. 2008, 42(3): 215-227, enclosed as pp. 1-24. (Year: 2008).*
International Search Report and Written Opinion of the International Searching Authority, dated Jul. 15, 2020, corresponding to counterpart International Application No. PCT/US2020/023259; 8 pages.
Meurs et al., "Neuropeptide Y increases in vivo hippocampal extracellular glutamate levels through Y1 receptor activation," Neuroscience Letters, vol. 510, (2012); pp. 143-147.
Serova et al., "NPY1 Receptor Agonist Modulates Development of Depressive-Like Behavior and Gene Expression in Hypothalamus in SPS Rodent PTSD Model," Frontiers in Neuroscience, vol. 11, Article 203, Apr. 2017; pp. 1-7.
Nwokafor et al., "Activation of NPY receptor subtype 1 by [D-His26]NPY is sufficient to prevent development of anxiety and depressive like effects in the single prolonged stress rodent model of PTSD," Neuropeptides 80, (2020); pp. 1-8.
Merrifield, "Solid Phase Peptide Synthesis. I The Synthesis of a Tetrapeptide1," Jul. 20, 1963, vol. 85; pp. 2149-2154.
Biological Psychiatry, Correspondence, "It is Time to Address the Crisis in the Pharmacotherapy of Posttraumatic Stress Disorder: A Consensus Statement of the PTSD Psychopharmacology Working Group," Oct. 1, 2017, vol. 32; pp. 651-659.

* cited by examiner

*Primary Examiner* — Julie Ha
(74) *Attorney, Agent, or Firm* — Carter, DeLuca & Farrell LLP; George Likourezos

(57) ABSTRACT

Intranasal neuropeptide Y (NPY) analogs having D-amino acids, such as [$D^{26}$-His]-NPY are provided for early intervention to prevent or to treat, to reverse, or reduce symptoms of stress-related impairments such as PTSD, depression, substance abuse, and/or memory deficits following exposure to traumatic or surgical stress.

14 Claims, 10 Drawing Sheets

Specification includes a Sequence Listing.

FIG. 9A-C
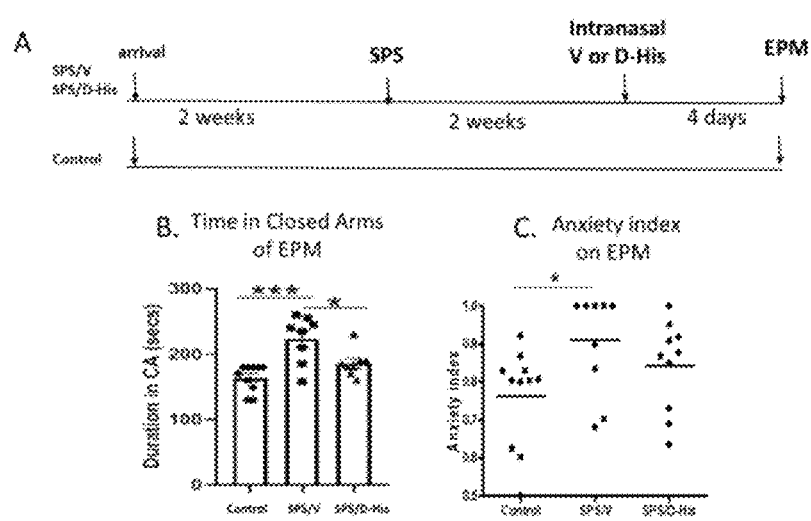

INTRANASAL NEUROPEPTIDES FOR USE IN STRESS-RELATED IMPAIRMENTS

CROSS-REFERENCE TO RELATED APPLICATION

This application is a national stage entry of International Application No. PCT/US2020/023259, filed Mar. 18, 2020, which claims benefit and priority to U.S. Provisional Application No. 62/819,820, filed Mar. 18, 2019, which are incorporated herein by reference in their entireties.

GOVERNMENT SUPPORT

This invention was made with government support under Grant No. W81XWH-16-1-0016 awarded by the US Army. The government has certain rights in the invention.

REFERENCE TO SEQUENCE LISTING SUBMITTED VIA EFS-WEB

This application includes an electronically submitted sequence listing in .txt format. The .txt file contains a sequence listing entitled "2686-3 PCT ST25.txt". The sequence listing contained in this .txt file is part of the specification and is hereby incorporated by reference herein in its entirety

TECHNICAL FIELD

The present disclosure relates to pharmaceutical compositions comprising intranasal neuropeptide Y (NPY) analogs having D-amino acids, such as [$D^{26}$-His]-NPY and their use in early intervention to prevent or to treat, reverse, or reduce symptoms of stress-related impairments such as post traumatic stress syndrome (PTSD), depression, substance abuse, and/or memory deficits following exposure to traumatic or surgical stress.

BACKGROUND

PTSD is a severe neuropsychiatric disorder that develops in a subset of individuals following an extreme or life-threatening trauma. Burdens associated with PTSD and its co-morbidities are extremely debilitating and difficult to treat. PTSD is co-morbid with depression and other anxiety disorders, substance abuse, alcoholism and sleep disturbances. Individuals with PTSD have a high risk for suicide and indeed PTSD related suicide is the 10th leading cause of death in the United States. The symptoms of PTSD can be very long-lasting, with enormous personal and societal costs.

Unfortunately, there is a paucity of effective pharmacological agents directed towards PTSD. As detailed in a recent report of the PTSD Psychopharmacology Working Group (Biological Psychiatry, 2017, e51-e59) there is a crisis in the pharmacotherapy of PTSD. No new medications have been approved for the treatment of PTSD in the US since 2001. The antidepressants, sertraline (Zoloft) and paroxetine (Paxil), both selective serotonin reuptake inhibitors (SSRIs), are the only drugs approved by the FDA for treating PTSD.

Unfortunately, only 60% of patients show improvement, while barely 30% goes into remission with SSRIs. Clearly, there is a dire need for better preventatives or treatments for PTSD and co-morbid disorders.

SUMMARY

The present disclosure relates to the use of intranasally administered neuropeptide Y (NPY) analogs with D-amino acids, such as [$D^{26}$-His]NPY, for early intervention to prevent, treat, and/or reverse, symptoms of stress-related impairments such as PTSD, depression and substance abuses. As disclosed herein, [$D^{26}$-His]NPY, which is a selective agonist for the NPY receptor subtype 1 (Y1R), was found to be extremely effective in an animal model of PTSD to act as a means for preventing development of anxiety and depressive like symptoms following exposure to traumatic stress.

Accordingly, intranasal delivery of [$D^{26}$-His]NPY, as well as other agonists of the NPY receptor subtype 1 (Y1R) comprising D-amino acids, are provided as an effective treatment for early intervention and/or treatment of PTSD, anxiety disorders, depression, substance abuse and other stress-triggered disorders. The advantages of such treatments include the ease of delivery, even self-delivery, to the brain in a non-invasive fashion. The selectivity of the effect compared to neuropeptide Y itself, and to other Y1R agonists, such as [$Leu^{31}Pro^{34}$]NPY, as well as the expected effectiveness at lower doses and the greater stability of the compound, are important advantages provided by the present disclosure. The usefulness of intranasal delivered NPY analogs, such as those comprising D-His amino acids, is not restricted to prevention of stress-related impairments such as PTSD, depression or substance abuse. Methods are also provided for use of such NPY analogs during surgery, such as open-heart surgery, to prevent development of stress-related impairments.

BRIEF DESCRIPTION OF THE DRAWINGS

Various embodiment of the peptide compositions and methods are described herein with reference to the drawings wherein:

(FIG. 2B)

FIG. 9A-C depicts the ability of [D-$^{26}$His]NPY to reverse symptoms evoked by traumatic stress once they have developed. FIG. 9A. Scheme of the experiment; FIG. 9B. Duration in the closed arms, an indication of anxiety; FIG. 9C. Anxiety index. *p<0.05, ***p<0.001.

DETAILED DESCRIPTION

Figure 1:
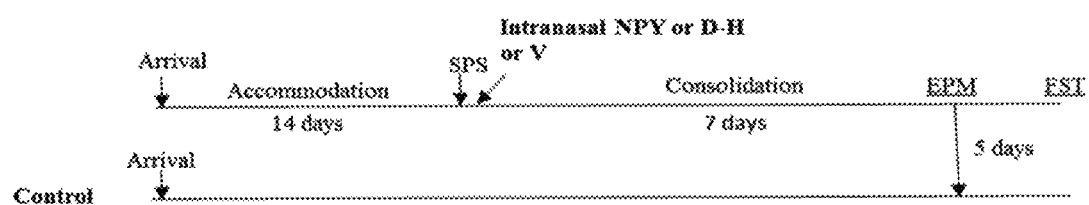
FIG. 1 depicts the experimental design for demonstration of the effectiveness of intranasal infusion Y1R agonist [$D^{26}$His]NPY (DH), compared to that of NPY, on traumatic stress elicited changes in anxiety and depressive like behavior in the Single Prolonged Stress (SPS) model of PTSD (FIG. 2-5). After a 14 day acclimation period, the rats were exposed to SPS stressors, and while still under the influence of ether, one group (SPS/V) was given intranasal vehicle (V), another group (SPS/NPY) was given intranasal 150 µg NPY per rat, another (SPS/DH) given intranasal 150 µg [$D$-$^{26}$His]NPY (D-H) and one group unstressed. After 7 days, the animals were tested on the elevated plus maze (EPM) for 5 min for various features of anxiety and locomotion and 5 days later for depressive/despair symptoms on the Forced Swim Tet (FST).

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described herein.

Abbreviations

ANOVA: analysis of variance
HPA axis: hypothalamic-pituitary-adrenal axis
EPM: elevated plus maze
icv: intracrebovascular
IN: intranasal
LC: locus coeruleus
LC/NE: system locus coeruleus/norepinephrine-autonomic neurons system
NE: norepinephrine
PVN: paraventricular nucleus
RH: corticotropin-releasing hormone
CRF: corticotropin-releasing factor
CRHR1 or CRHR2: corticotropin-releasing hormone receptor 1 or 2
ACTH: adrenocorticotropic hormone
CNS: central nervous system
PNS: peripheral nervous system
PTSD: posttraumatic stress disorder
CSF: cerebral spinal fluid
SSRI: serotonin selective reuptake inhibitor
DH: D[His6]NPY Y1 receptor agonist
FST: forced swim test
NPY: neuropeptide Y
rtPCR: real-time polymerase chain reaction
SEM: standard error of mean
SI: Social Interaction
SPS: single prolonged stress
SPS/NPY: given intranasal NPY immediately after SPS stressors
SPS/V: given intranasal vehicle immediately after SPS stressors
AS: acoustic startle
Y1R: Neuropeptide Y receptor subtype 1

The presently disclosed subject matter provides a method for treating stress-related impairments through intranasal administration of a neuropeptide Y analog. Such neuropeptide Y analogs include, for example, analogs with D-amino acids. In one aspect, the analog is [D$^{26}$-His]NPY. As demonstrated in the working examples provided herein, experimental data reveals that [D$^{26}$-His]NPY is superior to NPY on several behavioral tests. In addition, while intranasal infusion of [Leu$^{31}$Pro$^{34}$]NPY administered after traumatic stress prevented development of depressive-like symptoms, in contrast to [D$^{26}$-His]NPY, it was ineffective to prevent the development of anxiety.

The 36 amino acid peptide of rat and human NPY comprises the following amino acid sequence with a C-terminal amide: Tyr-Pro-Ser-Lys-Pro-Asp-Asn-Pro-Gly-Glu-Asp-Ala-Pro-Ala-Glu-Asp-Met-Ala-Arg-Tyr-Tyr-Ser-Ala-Leu-Arg-His-Tyr-Ile-Asn-Leu-Ile-Thr-Arg-Gln-Arg-Tyr-NH2 (SEQ ID NO:1). In particular, the method of treatment relates to the use of NPY analogues of the 36 amino acid peptide containing D-His amino acids. In a specific embodiment, the NPY analogue for use in treatment of PTSD and associated disorders is [D$^{26}$-His]NPY. NPY analogs for use in the disclosed methods of treatment are commercially available (Abjent, San Diego, CA) or can be custom synthesized from a peptide synthesizing company or recombinantly expressed.

The skilled artisan will readily appreciate that the embodiments are not limited to the [D$^{26}$-His]NPY sequences depicted herein, but also includes variants of [D$^{26}$-His]NPY. Such variants may contain deletions, substitutions or additions of one or more amino acids in the above depicted amino acid sequence of SEQ ID NO. 1 while maintaining the biological activity of the [D$^{26}$-His]NPY. Such variants include those, for example, that increase the half-life or stability of the [D$^{26}$-His]NPY polypeptide. Such fragments or variants may be naturally occurring or may be synthetically generated, for example, by modifying one or more of the above peptide sequences used in the methods of certain embodiments and evaluating their effects using any of a number of techniques well known in the art.

As used herein, a peptide fragment or variant has amino acid sequences that are at least about 70-75%, typically at least about 80-85%, and most typically at least about 90-95%, 97%, 98% or 99% or more homologous with the [D$^{26}$-His]NPY polypeptide (SEQ ID NO. 1) or peptide fragments thereof. In certain embodiments, a fragment or variant will contain conservative substitutions. A "conservative substitution" is one in which an amino acid is substituted for another amino acid that has similar properties, such that one skilled in the art of peptide chemistry would expect the secondary structure and hydropathic nature of the polypeptide to be substantially unchanged. Modifications may be made in the structure of the polynucleotides and polypeptides of certain embodiments and still obtain a functional molecule that encodes a variant or derivative polypeptide with desirable characteristics.

In a [$D^{26}$-His]NPY polypeptide, suitable conservative substitutions of amino acids are known to those of skill in this art and generally can be made without altering a biological activity of a resulting molecule. Those of skill in this art recognize that, in general, single amino acid substitutions in non-essential regions of a polypeptide do not substantially alter biological activity (see, e.g., Watson et al. Molecular Biology of the Gene, 4th Edition, 1987, The Benjamin/Cummings Pub. Co., p. 224). One of skill in the art could determine which amino acid residues can be substituted, inserted, or deleted without abolishing biological activity. Assistance can be found using computer programs well known in the art, such as DNASTAR™ software. A conservative amino acid change involves substitution of one of a family of amino acids which are related in their side chains. Naturally occurring amino acids are generally divided into four families: acidic (aspartate, glutamate), basic (lysine, arginine, histidine), non-polar (alanine, valine, leucine, isoleucine, proline, phenylalanine, methionine, tryptophan), and uncharged polar (glycine, asparagine, glutamine, cystine, serine, threonine, tyrosine) amino acids. Phenylalanine, tryptophan, and tyrosine are sometimes classified jointly as aromatic amino acids.

Fragments, or variants, or derivatives of [$D^{26}$-His]NPY polypeptides include glycosylated forms, aggregative conjugates with other molecules, and covalent conjugates with unrelated chemical moieties (e.g., pegylated molecules). Covalent variants can be prepared by linking functionalities to groups which are found in the amino acid chain or at the N- or C-terminal residue, as is known in the art. Variants also include allelic variants, species variants, and mutants. Truncations or deletions of regions which change functional activity of the proteins are also variants.

Methods of producing [$D^{26}$-His]NPY polypeptides, polypeptide fragments or variants thereof, for use in the methods disclosed herein may be made in a variety of ways. For example, solid phase synthesis techniques may be used. Suitable techniques are well known in the art, and include those described in Merrifield, in Chem. Polypeptides, pp. 335-61 (Katsoyannis and Panayotis eds. 1973); Merrifield, J. Am. Chem. Soc. 85:2149 (1963); Davis et al., Biochem. Intl. 10:394-414 (1985); Stewart and Young, Solid Phase Peptide Synthesis (1969); U.S. Pat. No. 3,941,763; Finn et al., The Proteins, 3rd ed., vol. 2, pp. 105-253 (1976); and Erickson et al., The Proteins, 3rd ed., vol. 2, pp. 257-527 (1976). Solid phase synthesis is a technique of making individual peptides since it is the most cost-effective method of making small peptides. The [$D^{26}$-His]NPY polypeptides may also be produced recombinantly in transformed host cells using recombinant DNA techniques. To do so, a recombinant DNA molecule coding for the protein is prepared. Methods of preparing such DNA and/or RNA molecules are well known in the art.

The present disclosure provides pharmaceutical compositions comprising an effective amount of a NPY analogue designed for intranasal delivery for prevention and treatment of PTSD and associated disorders. Such NPY analogs, for inclusion in pharmaceutical compositions include, for example, those containing D-His amino acids. In a specific embodiment, the NPY analog is [$D^{26}$-His]NPY. For intranasal delivery, in addition to the active ingredient, pharmaceutical compositions may contain suitable pharmaceutically acceptable carriers comprising excipients and auxiliaries which facilitate processing of the active compounds into preparations which can be used pharmaceutically. The agents of the disclosure may be formulated by methods known to those of skill in the art, and may include, for example, but not limited to, examples of solubilizing, diluting, or dispersing substances, such as saline, preservatives, such as benzyl alcohol, absorption promoters, and fluorocarbons. Optimized formulations for intranasal delivery may include addition of permeability enhancers (mucoadhesives, nanoparticles, and the like) as well as combined use with an intranasal drug delivery device (for example, one that provides controlled particle dispersion with particles aerosolized to target the upper nasal cavity).

The pharmaceutical compositions disclosed herein are intended for administration of a to the nasal structures of a treated subject. The definition of "pharmaceutically acceptable" is meant to encompass any substance which does not unacceptably interfere with effectiveness of the biological activity of the active ingredient and that is not unacceptably toxic to the host to which it is administered.

Intranasal administration as used herein is defined as administration via the nasal structures, for example, through the nasal cavity, thereby enabling the absorption of a therapeutically effective amount of drug substance through the nasal structures. Pharmacologically active amounts of the drug substance are thereby delivered to the circulation or directly to the site of action i.e. the central nervous system via nasal to brain uptake. The present disclosure relates to a dosage form (for example a nasal spray, a nasal gel, a nasal ointment, inhalation solutions, inhalation suspensions, inhalation sprays, dry powder or an aerosol) which is specifically designed or adapted for administration of a drug substance to the nasal structures. Hence in one aspect the disclosure relates to the [$D^{26}$-His]NPY disclosed herein for use in a therapeutic method, wherein the drug substance is administered intranasally. In an embodiment, administration is to the upper nasal cavity.

The composition disclosed herein generally comprises a aqueous solution comprising [$D^{26}$-His]NPY. In an embodiment, the composition is isotonic. The isotonicity of the composition may generally be achieved and maintained using sodium chloride or another pharmaceutically acceptable isotonicity agent, such as, for example, dextrose, boric acid, sodium tartrate, other organic or inorganic solutes and mixtures thereof.

The composition may further include a pharmaceutically acceptable buffer in order to maintain the desired pH. Non-limiting examples of suitable buffers used to adjust and maintain the pH of the composition include acetate, citrate, prolamine, phosphate, carbonate, phthalate, borate, or other pharmaceutically acceptable buffers and mixtures thereof. In a particular embodiment, the buffer comprises sodium phosphate. The pH of the composition is maintained generally to be compatible with the fluids of the nasal membrane in order to minimize irritation.

The present composition may also contain various pharmaceutically acceptable additives such as tolerance enhancers (sometimes more specifically referred to as humectants), absorption enhancers (sometimes also referred to as surfactants), preservatives, viscosity modifying agents (e.g., thickening agents), osmolarity adjusters, complexing agents, stabilizers, solubilizers, or any combination thereof.

A tolerance enhancer may be used in order to inhibit drying of the nasal membrane or mucosa. A tolerance enhancer may also serve the purpose of inhibiting or relieving irritation of the nasal membranes. Examples of suitable tolerance enhancers include, for example, humectants such as sorbitol, propylene glycol, glycerol, glycerin, hyaluronan, aloe, mineral oil, vegetable oil, soothing agents, membrane conditioners, sweeteners, and mixtures thereof.

A surfactant or absorption enhancer may also be used in the composition in order to enhance the absorption of the compound across the nasal membrane. Suitable absorption enhancers include non-ionic, anionic and cationic surfactants. Any of a number of well-known surfactants may be used, including, for example, polyoxyethylene derivatives of fatty acids, partial esters of sorbitol anhydrides, sodium lauryl sulfate, sodium salicylate, oleic acid, lecithin, dehydrated alcohol, Tween (e.g., Tween 20, Tween 40, Tween 60, Tween 80 and the like), Span (e.g., Span 20, Span 40, Span 80 and the like), polyoxyl 40 stearate, polyoxy ethylene 50 stearate, edetate disodium, propylene glycol, glycerol monooleate, fusieates, bile salts, octoxynol and combinations thereof.

A pharmaceutically acceptable thickening agent may also be used in the composition in order to modify the viscosity of the composition. Numerous pharmaceutically acceptable thickening agents are well-known and include, for example, methyl cellulose, xanthan gum, carboxymethyl cellulose, hydroxypropyl cellulose, carbomer, polyvinyl alcohol, alginates, acacia, chitosans and combinations thereof. The concentration of the thickening agent will depend upon the agent selected and the viscosity desired.

A preservative may also be employed to increase the shelf-life of the composition. A number of well-known and pharmaceutically acceptable preservatives may be used in the present composition, including, for example, parabens, thimerosal, chlorobutanol, benzalkonium chloride, or benzyl alcohol and combinations thereof. Other ingredients which extend shelf life can be added such as for example, antioxidants. Examples of antioxidants include sodium metabisulfite, potassium metabisulfite, ascorbyl palmitate and other pharmaceutically acceptable antioxidants.

Alternatively, and in accordance with the present disclosure, the [$D^{26}$-His]NPY composition may be formulated to be a sterile, preservative-free composition. While preservatives may extend the shelf life of a composition, they may also cause or exacerbate irritation to the nasal membranes. Furthermore, depending on the frequency with which the composition of the present disclosure is administered, a bottle of typical volume for storing and dispensing the composition may be emptied before the occurrence of the degradation, spoilage, or bacterial growth that a preservative is meant to prevent.

In embodiments, the dosage forms of medicaments intended for intranasal administration are a liquid, a suspension or a solid. A suspension is a liquid preparation containing solid particles dispersed in a liquid vehicle. The dosage forms may be metered. For examples, metered drops/sprays mean that the dispenser that includes the drops/spray delivers the drops/spray containing a metered dose (a predetermined quantity) of the [$D^{26}$-His]NPY.

One dosage form in the context of the intranasal administration route includes nasal drops. Nasal drops are simple to self-administer and enjoy wide acceptance among patients. Drops are deposited mostly in the posterior portion of the nose and thus removed rapidly into the nasal pharynx.

Another intranasal dosage form by which the [$D^{26}$-His]NPY can be administered is nasal sprays. Nasal sprays typically contain the [$D^{26}$-His]NPY dissolved or suspended in a solution or a mixture of excipients (e.g. preservatives, viscosity modifiers, emulsifiers, buffering agents) in a non-pressurized dispenser. Nasal sprays have several advantages including compactness of the delivery device, convenience, simplicity of use, and accuracy of delivering dosages. They are deposited in the anterior portion of the nose and cleared slowly into nasal pharynx by mucociliary clearance. The nasal spray as used herein can be a liquid or a suspension.

Another intranasal dosage form is a nasal aerosol. Nasal aerosols differ from nasal sprays by the method of drug dispensing: in aerosols, a drug is dispensed due to an excess of pressure and releases through a valve. In sprays, a drug is dispensed due to forcing away by a micropump bucket, while the pressure in the vial is similar to atmosphere pressure. Aerosols have similar advantages as sprays.

The [$D^{26}$-His]NPY of the present disclosure may alternatively be administered by nasal emulsions, ointments, gels, pastes or creams. These are highly viscous solutions or suspensions applied to the nasal mucosa. Their efficacy of drug absorption may be better as compared to drops because the high viscosity may prevent the [$D^{26}$-His]NPY from running out of the nasopharynx.

Accordingly, the presently disclosed subject matter provides a method for treating a stress-related impairments in a subject in need of treatment thereof, the method comprising intranasal administration to the subject of a therapeutically effective amount of a NPY analog, including in some embodiments, an effective amount for delivery to the brain. In embodiments, the method results in an increase in total brain concentration and an increase in brain-to-plasma partition ratio of the NPY analog as compared to using other administration routes.

"Treatment," as used herein, includes any drug, drug product, method, procedure, lifestyle change, or other adjustment introduced in attempt to effect a change in a particular aspect of a subject's health (i.e., directed to a particular disease, disorder, or condition) or alleviate or mitigate symptoms of a particular disease, disorder or condition. "Disease," "disorder," and "condition" are commonly recognized in the art and designate the presence of signs and/or symptoms in an individual or patient that are generally recognized as abnormal and/or undesirable. Diseases or conditions may be diagnosed and categorized based on pathological changes.

The terms "treat," "treating" or "treatment" of any disease or disorder as used herein refer in one embodiment, to halting the progression of the condition or disease, or to ameliorating the disease or disorder (i.e., slowing or arresting or reducing the development of the disease or at least one of the clinical symptoms thereof). In another embodiment "treat," "treating" or "treatment" refers to alleviating or ameliorating at least one physical parameter including those which may not be discernible by the patient. In yet another embodiment, "treat," "treating" or "treatment" refers to modulating the disease or disorder, either physically, (e.g., stabilization of a discernible symptom), physiologically, (e.g., stabilization of a physical parameter), or both. In yet another embodiment, "treat," "treating" or "treatment" refers to preventing or delaying the onset or development or progression of the disease or disorder. As used herein, a subject is "in need of" a treatment if such subject would benefit biologically, medically or in quality of life from such treatment.

In embodiments, the stress-related impairments, or associated disorders, that can be treated with NPY analogues include, for example, anxiety and depressive like symptoms, hyperarousal, regulation of feeding behavior, blood pressure, circadian rhythm, learning, memory, vascular remodeling, cell proliferation, angiogenesis, as well as behavioral responses to stress, mood disorders and alcoholism, substance abuse, pain, and sleep disorders.

One typical dosage would be in the range from about 1 µg/kg body weight to 1000 mg/kg body weight. In other non-limiting examples, a dose may also comprise from about 1 µg/kg body weight, about 5 µg/kg body weight, about 10 µg/kg body weight, about 50 µg/kg body weight, about 100 µg/kg body weight, about 200 µg/kg body weight, about 350 µg/kg body weight, about 500 µg/kg body weight, about 1 mg/kg body weight, about 5 mg/kg body weight, about 10 mg/kg body weight, about 50 mg/kg body weight, about 100 mg/kg body weight, about 200 mg/kg body weight, about 350 mg/kg body weight, about 500 mg/kg body weight, to about 1000 mg/kg body weight or more per administration, and any range derivable therein.

The progress of this therapy is easily monitored by conventional techniques and assays. The [$D^{26}$-His]NPY polypeptides of certain embodiments will generally be used in an amount effective to achieve the intended purpose. For use to treat or prevent a disease condition, the [$D^{26}$-His]NPY polypeptides of these embodiments, or pharmaceutical compositions thereof, are administered or applied in a therapeutically effective amount. Determination of a therapeutically effective amount is well within the capabilities of those skilled in the art, especially in light of the detailed disclosure provided herein.

A therapeutically effective dose can be estimated initially from in vitro assays, such as cell culture assays. A dose can then be formulated in animal models to achieve a circulating concentration range that includes the IC50 as determined in cell culture. Such information can be used to more accurately determine useful doses in humans.

Initial dosages can also be estimated from in vivo data, e.g., animal models, using techniques that are well known in the art. One having ordinary skill in the art could readily optimize administration to humans based on animal data.

The attending physician for patients treated with [$D^{26}$-His]NPY polypeptides of certain embodiments would know how and when to terminate, interrupt, or adjust administration due to toxicity, organ dysfunction, and the like. Conversely, the attending physician would also know to adjust treatment to higher levels if the clinical response were not adequate (precluding toxicity). The magnitude of an administered dose in the management of the disorder of interest will vary with the severity of the condition to be treated, with the route of administration, and the like. The severity of the condition may, for example, be evaluated, in part, by standard prognostic evaluation methods. Further, the dose and perhaps dose frequency will also vary according to the age, body weight, and response of the individual patient.

As used herein, in general, the "effective amount" of an NPY analog refers to an amount sufficient to produce the desired effect, such as delivering the amount of active agent. A "therapeutically effective amount" of a therapeutic agent refers to the amount of the agent necessary to elicit the desired biological response. In a specific embodiment, an effective amount is an amount sufficient for prevention or treatment of PTSD and associated disorders.

As will be appreciated by those of ordinary skill in the art, the effective amount of an agent may vary depending on such factors as the desired biological endpoint, the agent to be delivered, the composition of the pharmaceutical composition, the target tissue or cell, and the like. In some embodiments, the term "effective amount" refers to an amount sufficient to reduce or ameliorate the severity, duration, progression, or onset of a disease, disorder, or condition, or one or more symptoms thereof; prevent the advancement of a disease, disorder, or condition, cause the regression of a disease, disorder, or condition; prevent the recurrence, development, onset or progression of a symptom associated with a disease, disorder, or condition, or enhance or improve the prophylactic or therapeutic effect(s) of another therapy.

The subject treated by the presently disclosed methods in their many embodiments is desirably a human subject, although it is to be understood that the methods described herein are effective with respect to all vertebrate species, which are intended to be included in the term "subject." Accordingly, a "subject" can include a human subject for medical purposes, such as for the treatment of an existing condition or disease or the prophylactic treatment for preventing the onset of a condition or disease, or an animal subject for medical, veterinary purposes, or developmental purposes. Suitable animal subjects include mammals including, but not limited to, primates, e.g., humans, monkeys, apes, and the like; bovines, e.g., cattle, oxen, and the like; ovines, e.g., sheep and the like; caprines, e.g., goats and the like; porcines, e.g., pigs, hogs, and the like; equines, e.g., horses, donkeys, zebras, and the like; felines, including wild and domestic cats; canines, including dogs; lagomorphs, including rabbits, hares, and the like; and rodents, including mice, rats, and the like. An animal may be a transgenic animal. In some embodiments, the subject is a human including, but not limited to, fetal, neonatal, infant, juvenile, and adult subjects. Further, a "subject" can include a patient afflicted with or suspected of being afflicted with a condition or disease. Thus, the terms "subject" and "patient" are used interchangeably herein.

In another aspect of the embodiment, an article of manufacture (e.g., a kit) containing materials useful for the treatment of stress-related impairments, or associated disorders, as described above is provided. The article of manufacture comprises a container and a label or package insert on or associated with the container. Suitable containers include, for example, bottles, vials, aerosol containers, spray bottles etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle).

The label or package insert indicates that the composition is used for treating the condition of choice. The article of manufacture may comprise a container with a composition contained therein, wherein the composition comprises [$D^{26}$-His]NPY.

Kits in certain embodiments may further comprise a package insert indicating that the compositions can be used to treat a particular condition. Alternatively, or additionally, the kit may further comprise a second (or third) container comprising a pharmaceutically-acceptable buffer, such as phosphate-buffered saline, Ringer's solution and dextrose solution. It may further include other materials desirable from a commercial and user standpoint, including other buffers and diluents.

All documents, papers and published materials referenced herein, including books, journal articles, and manuals, patent applications, published patent applications and patents, are expressly incorporated herein by reference in their entireties.

Example 1

The effectiveness of intranasal infusion Y1R agonist [D$^{26}$His]NPY (DH) was compared to that of NPY on traumatic stress elicited changes in anxiety and depressive like behavior in the Single Prolonged Stress (SPS) model of PTSD (Nwokafor et al.; 2020 Neuropeptides 80:102001). The experimental design is depicted in FIG. 1.

After a two week accommodation period rats were exposed to SPS stressors. While still under the influence of ether (the last SPS stressor), the rats were randomly assigned to receive either intranasal NPY or DH each at dose of 150 μg/rat, or vehicle (distilled water). Control unstressed rats were handled briefly and weighed on the same day. They were left undisturbed for a week and then tested for anxiety on Elevated Plus Maze (EPM) together with unstressed control rats. Five days later all the animals were tested for depresssive/dispair behavior by the Forced Swim Test (FST).

Figure 2A:
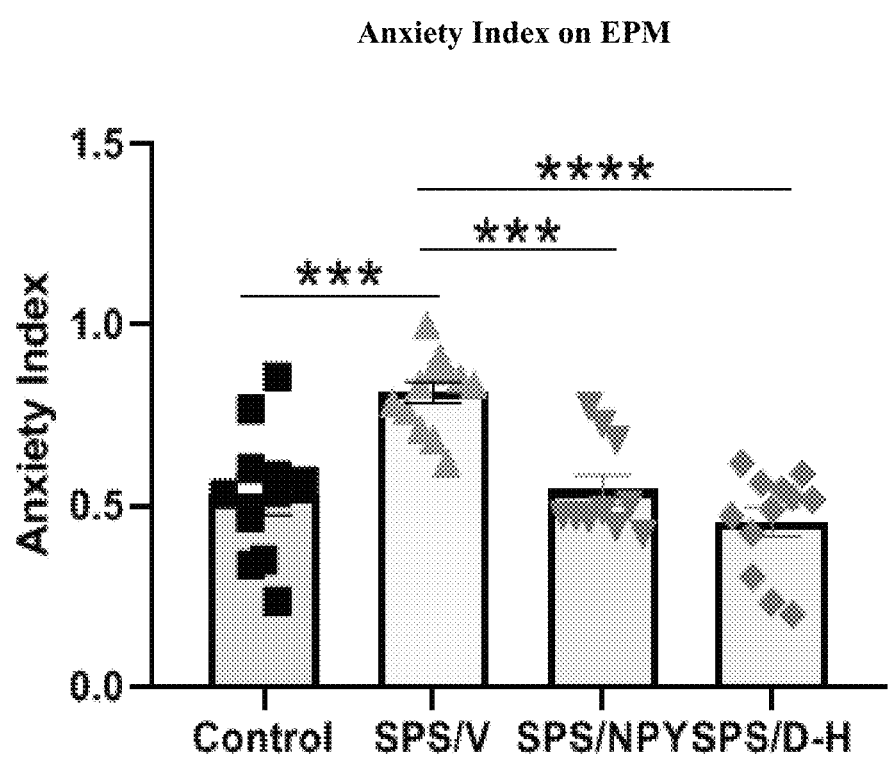
FIG. 2A-B depicts the effect of early intervention with intranasal infusion of NPY, Y1 agonists on the anxiety index seven days after SPS stressors. Based on the performance on the EPM the anxiety index was calculated for each rat. The anxiety index=1−[(time spent in open arm/total time on the maze)/2+(number of entries to the open arms/total exploration on the maze)/2] and is shown in FIG. 2A-B. Each point represents the values for an individual animal.*p<0.05; *p<0.001. The traumatic stress of SPS led to higher (p<0.001) anxiety index (SPS/V vs Control). This was prevented by early intervention with either NPY (p<0.001) or DH (p<0.001) (FIG. 2**A). However, intranasal administration of the Y1R agonist [$Leu^{31}Pro^{34}$]NPY at a concentration which prevent SPS elicited development of depressive symptoms (Serova et al. 2017 Front Neurosci 11:203) did not reduce the SPS elicited anxiety.
Figure 2B:
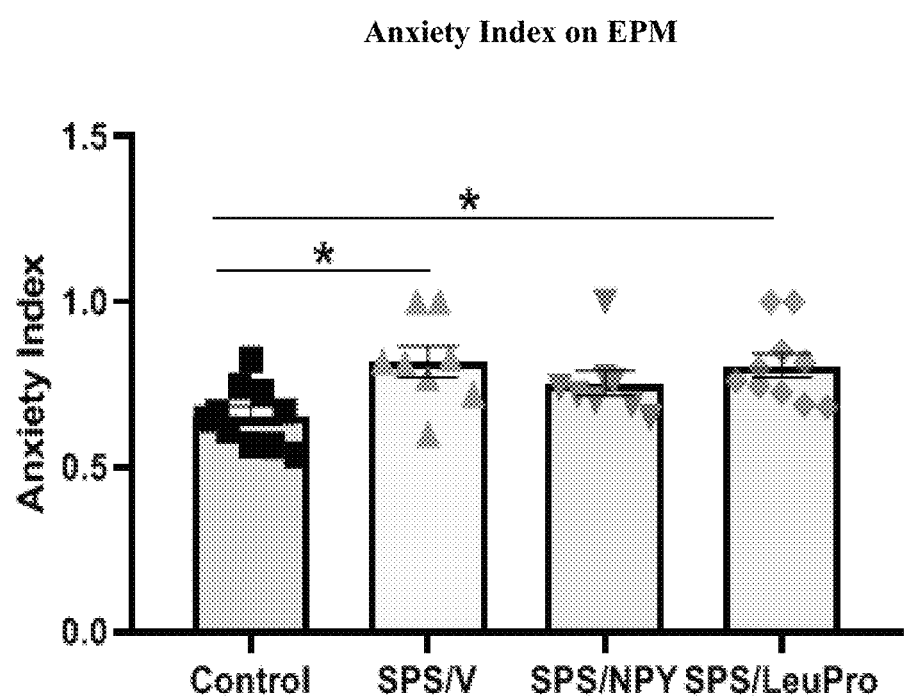

FIG. 2. demonstrates that the effect of early intervention with intranasal infusion of NPY or the Y1R agonist DH (FIG. 2A), but not [Leu$^{31}$Pro$^{34}$] NPY (FIG. 2B), reduces the SPS triggered rise in anxiety. Based on the performance on the EPM the anxiety index was calculated for each rat. The anxiety index=1–[(time spent in open arm/total time on the maze)/2+(number of entries to the open arms/total exploration on the maze)/2] and is shown in FIG. 2. The traumatic stress of SPS led to higher (p<0.001) anxiety index (SPV vs unstressed Control). This was prevented by early intervention with either NPY (p<0.001) or DH (p<0.0001). Each point represents the values for an individual animal.

Figure 3:
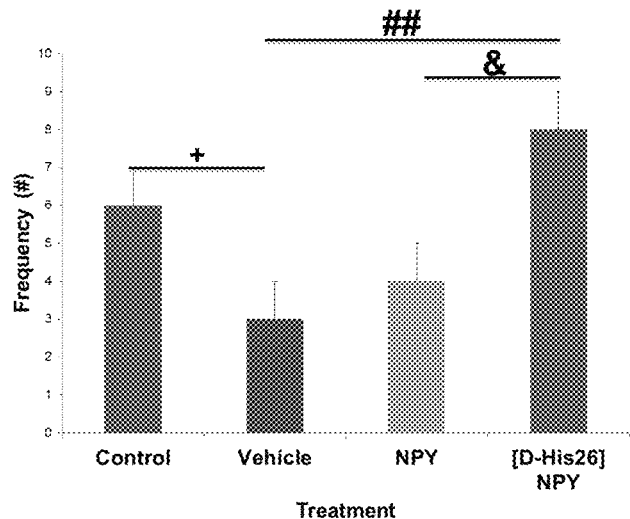
FIG. 3 depicts the frequency and duration of head dips on the EPM. It shows mean±SEM, +* or & p≤0.05, ## or && p≤0.01 for the respective comparison. This additional feature of anxiety was reduced one week after SPS in the vehicle treated group subjected to SPS and recovered only in the group given [D-$^{26}$His]NPY.
Figure 3:
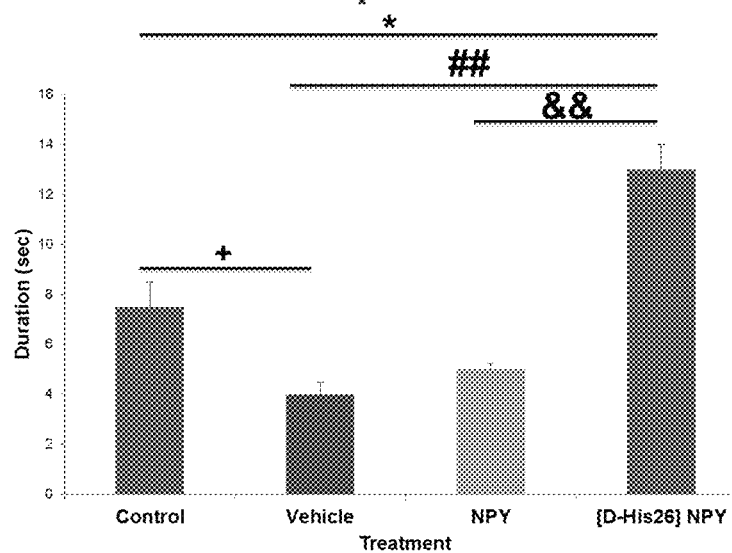

FIG. 3 demonstrates that [D$^{26}$His]NPY can also prevent the SPS triggered reduction in frequency and duration of unprotected head dips on the EPM, another measure of low anxiety. It was more effective than NPY for frequency (P<0.05) or duration (p<0.01) of head dips.

Figure 4:
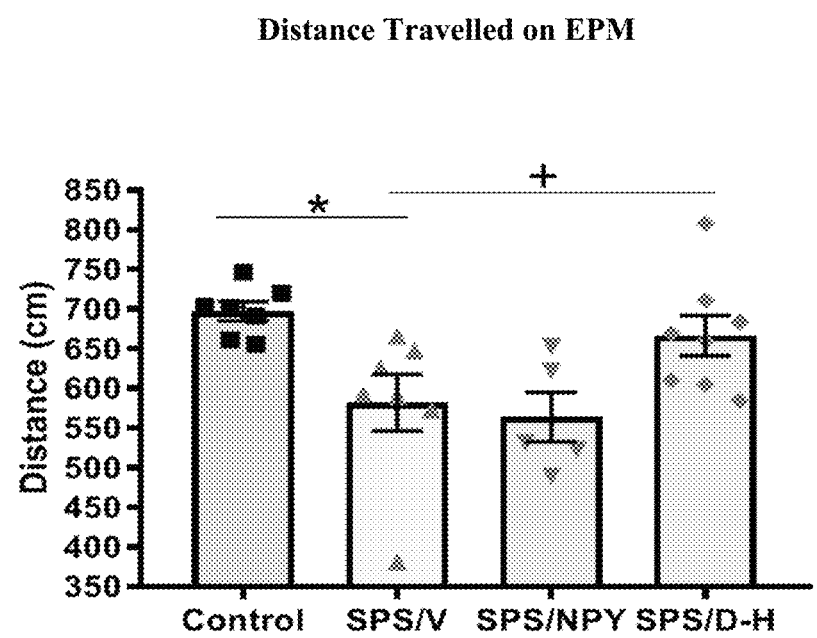
FIG. 4 depicts distance travelled on the EPM. Each dot represents an individual animal. *p<0.05 by ANOVA; +p<0.05 by t-test. The locomotion or distance travelled was reduced by SPS (SPS/V and SPS/NPY) but not by early intervention with [D-$^{26}$His]NPY (D-H).

FIG. 4: demonstrates that while early intervention with intranasal [D$^{26}$His]NPY, in contrast to NPY, did not reduce the distance traveled on the EPM, suggesting that it would not elicit sedation.

Figure 5:
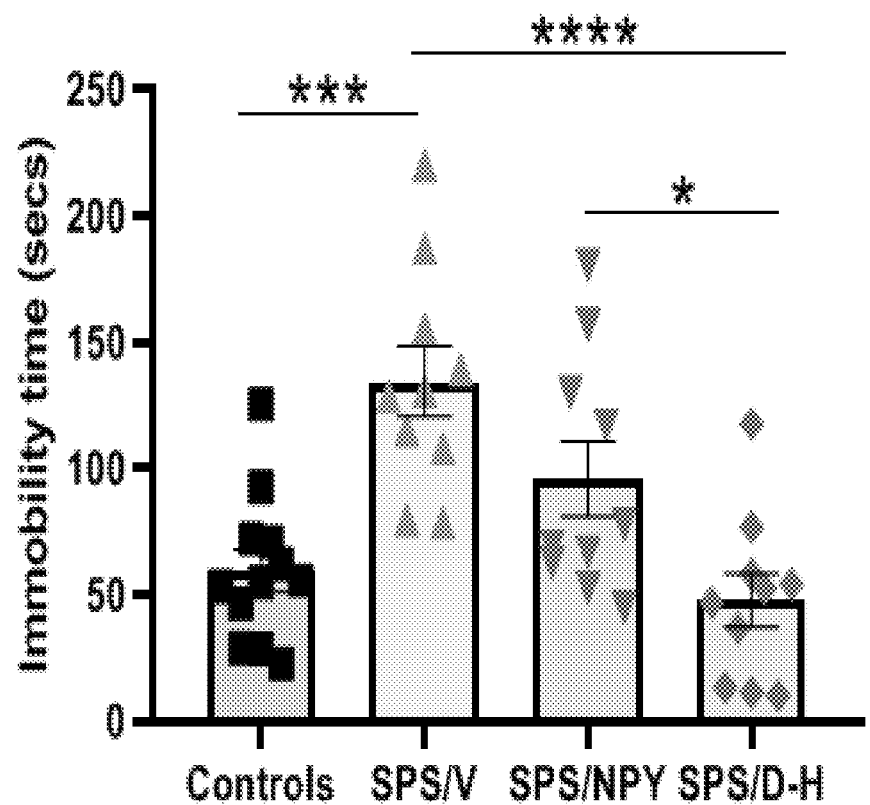
FIG. 5 shows the effect of early intervention with intranasal infusion of NPY or [D$^{26}$His]NPY (D-H), on immobility time in the Forced Swim Test (FST). The immobility time on the FST, which reflects depressive-lie behavior, despair or altered coping style was determined. Each point represents the values for an individual animal. *p<0.05, ***p<0.001. D-H was superior to NPY in preventing the depressive-like behavior.

FIG. 5 demonstrates the effect of early intervention with intranasal infusion of NPY or DH on immobility time in Forced Swim Test (FST): The depressive/despair like behavior, or alternative coping style, was assessed by the forced swim test (FST), 5 days after the EPM (12 days after exposure to the SPS stressors). As previously observed (Serova et al. 2013 Neuroscience 236:298-312), SPS led to greater immobility time in the FST (p<0.001) and this was reduced with NPY (p<0.05) or 1) or DH (p<0.0001) compared to SPS/V. DH was significantly more effective than NPY (p<0.05).

These data demonstrate that activation of the Y1. receptor subtype is sufficient to prevent the traumatic stress elicited impairments in anxiety and depressive behaviors. Intranasal infusion of [D-His$^{26}$]-NPY (DH) was exceptionally effective to prevent the development of anxiety and depressive/ despair like behavior following SPS. It was at least as effective as NPY on anxiety and more effective than NPY on depressive-despair behavior.

Therefore, [D-His$^{26}$]-NPY shows therapeutic usefulness as secondary treatment (early intervention) to prevent, the development of anxiety and depressive behaviors symptoms. These data demonstrate that activation of the Y1 receptor subtype is sufficient to prevent the traumatic stress elicited impairments in anxiety and depressive behaviors.

Example 2

PTSD is long-lasting and gets progressively worse (McFarlane et al. 2017, Curr Psychiatry Rep 19:10). It has been observed that there is worsening of the symptoms and increased anxiety with longer time (2 weeks versus 1 week) following the traumatic stress in the SPS, rat PTSD. In order to ascertain if early intervention would completely prevent the manifestation of PTSD-associated symptoms also at later time, the effect two weeks after the traumatic stress was studied. This is a time when "delayed" onset of anxiety and worsening symptoms are observed.

Figure 6:
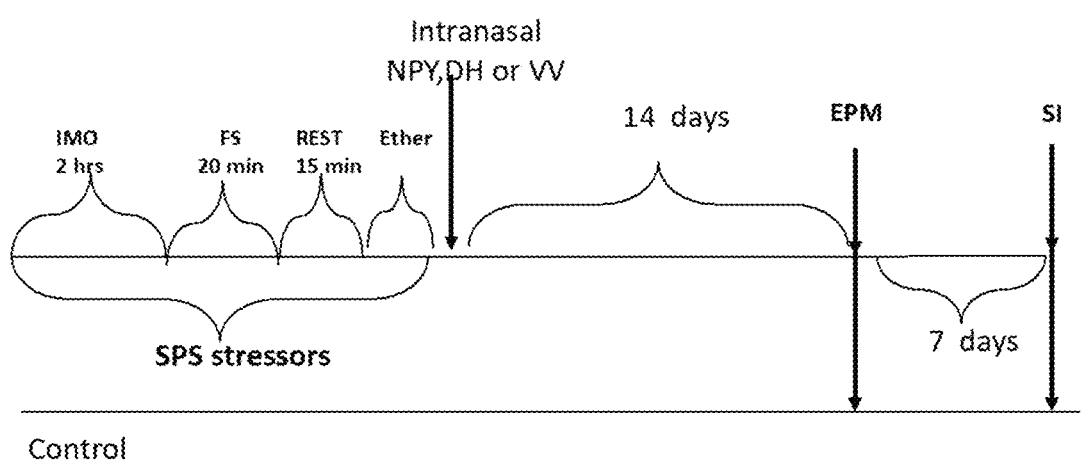
FIG. 6 depicts a diagram of the experimental procedure (FIGS. 7-8). After 14 day acclimation period the rats were exposed to SPS stressors, and while still under the influence of ether one group (SPS/V) was given intranasal vehicle (V), another group (SPS/NPY) was given 200 µg NPY per rat, another (SPS/D-H) given 150 µg [D-$^{26}$His]NPY (D-H) and one group unstressed. After two weeks the animals were tested on the elevated plus maze (EPM) for 5 min and 7 days later for social interaction (SI).

The effectiveness of early intervention with the Y1R selective agonist [D-$^{26}$His]NPY (D-H) compared to NPY on development of anxiety and impaired social interaction was examined. The experimental design was as depicted in FIG. 6. After 14 day acclimation period the rats were exposed to SPS stressors, and while still under the influence of ether one group (SPS/V) was given intranasal vehicle (V), another group (SPS/NPY) was given 200 [In NPY per rat, another (SPS/D-H) given 150 μg [D-$^{26}$His]NPY (D-H) and one group unstressed. After two weeks they were tested on the elevated plus maze (EPM) for 5 min and 7 days later for social interaction (SI).

Figure 7:
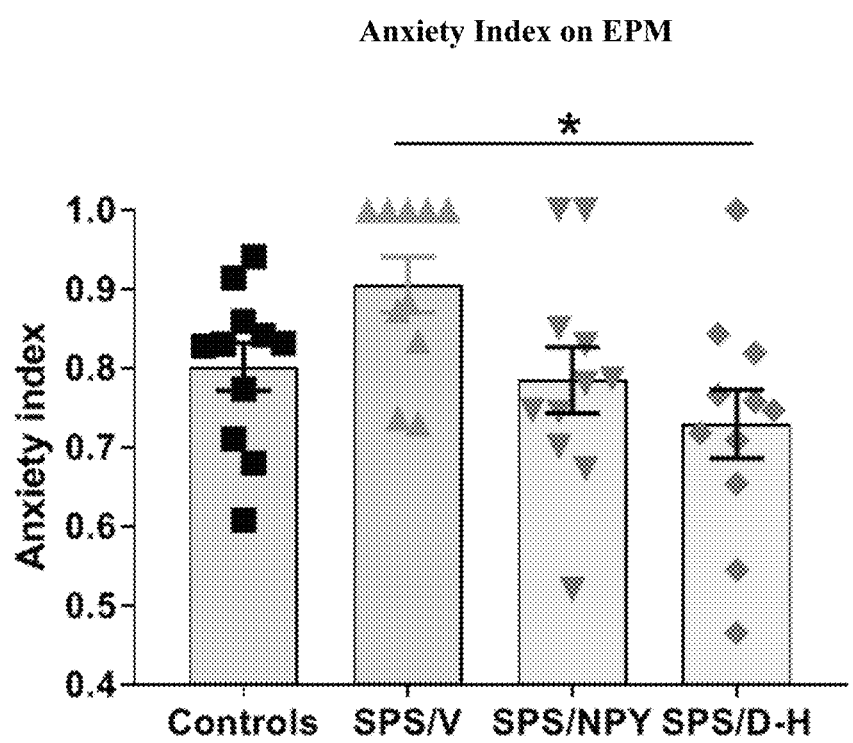
FIG. 7 shows anxiety index on the EPM. Each point represents the values for an individual animal. *p<0.05.

The results were as follows. The SPS treated group had a higher anxiety index. As seen one week after SPS stressor (FIG. 2A), early intervention with either intranasal 200 μm NPY and especially 150 μg {D-$^{26}$His]NPY (D-H), had significantly lower anxiety index compared to the SPS/V group, and did not differ from unstressed controls (See, FIG. 7).

The conclusions from the experiments are as follows: (1) early intervention with NPY or D-H prevented the development of anxiety symptoms even two weeks after the traumatic stress; (2) activation of the Y1R with D-H is sufficient to prevent the development of anxiety even two weeks after exposure to the traumatic stress; and (3) early intervention with the Y1R agonist D-H (SPS/D-H) was as effective as NPY at slightly lower concentration to enable more entries and duration in the open arms and reduced anxiety index.

A social interaction test was performed in the sound attenuated behavioral room in open-field apparatus consisting of a square open-faced arena with a black opaque plastic enclosure. It had a 75 cm×75 cm black floor area and 35 cm high walls. There was a video camera (NTSC IR sensitive) suspended 2 meters above the arena floor and connected to a computer.

One day prior to the social interaction test, each rat was acclimated to the apparatus for 5 min. On the testing day, rats (adult rats to be tested as well as juvenile males) were transferred with their home cages into the testing room for a 15-20 min acclimation period. The adult rat was place at a corner inside the open-field apparatus for 5 min and then a juvenile male rat was added at the opposite corner inside the apparatus and remained for another 5 min. Animal behavior was recorded and analyzed. The arena was cleaned with 70% ethanol after each session. The time period that adult rat spent sniffing, touching the juvenile rat and the numbers of times that the adult rat approached the juvenile rat were scored.

Figure 8:
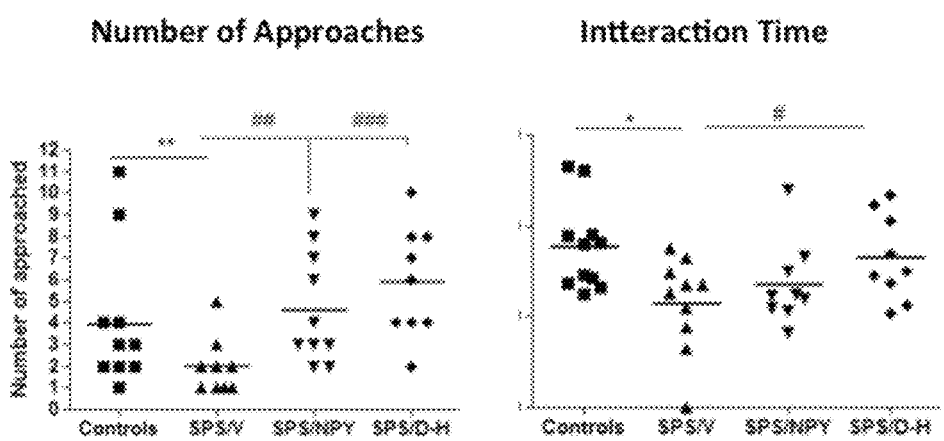
FIG. 8 depicts the number of approaches and interaction time on the social interaction test. *p<0.05, **p<0.01 compared to Controls, #p<0.05, ##p<0.01, ###p<0.001 compared to SPS/V.

As shown in FIG. 8 SPS reduced the number of approaches and interaction time with the juvenile rat. This was prevented by early intervention with either NPY or D-H.

The results reveal, for the first time that intranasal administration of [D$^{26}$His]NPY given shortly after the traumatic stress is at least as effective as NPY to prevent development of: symptoms of (i) anxiety (ii) depressive/despair behavior and (iii) impaired social interaction. The results described herein demonstrate that [D$^{26}$His]NPY has usefulness as an agent to prevent development of PTSD associated symptoms following exposure to traumatic stress.

Example 3

FIG. 9A-C demonstrates that [D$^{26}$His]NPY can be effective to reduce the traumatic stress triggered anxiety even after it is manifested. For this experiment animals were subjected to SPS model of PTSD and after 2 weeks were given intranasal [D$^{26}$His]NPY (300 μg/rat) or vehicle (SPS/V) and four days later tested on the EPM. While SPS/V group were more anxious and had spent more time in the closed arms (P<0.001) and had higher anxiety index (p<0.05), the group given [D$^{26}$His]NPY spent less time in the closed arms (p<0.05) and had an intermediate anxiety index. These results demonstrate that a Y1R agonist such as [D$^{26}$His]NPY could be effective not only to prevent, but also to reverse behavioral symptoms of PTSD triggered by exposure to traumatic stress.

Taking all these studies into consideration, the results demonstrate Y1R as the key mediator of NPY's protective effects on anxiety and depressive-like symptoms emanating from exposure to severe stress. They demonstrate that activation of the Y1R is sufficient to protect against the development of anxiety, impairments in social interaction and depressive/despair-like behaviors following traumatic stress. [D-His$^{26}$]NPY was especially effective compared to [Leu$^{31}$Pro$^{34}$]NPY. It was even demonstrated to be superior to NPY as an early intervention therapy to prevent the development of depressive-like symptoms and some features of anxiety and may have great therapeutic potential.

What is claimed:

1. A method for treating a subject suffering from or diagnosed with a stress related impairment selected from the group consisting of (i) depression; and (ii) post-traumatic stress disorder (PTSD) with one or more PTSD associated symptoms including anxiety, depression and impaired social interactions, said method comprising intranasal administration to the subject in need thereof of a therapeutically effective amount of a neuropeptide Y (NPY) analog wherein said NPY analog is [D-His$^{26}$]-NPY.

2. The method of claim 1, wherein depression is major depressive disorder, depression associated with bipolar.

3. The method of claim 1, wherein depression is treatment resistant depression.

4. The method of claim 1, wherein the treatment further comprises administering a second antidepressant.

5. The method of claim 1, wherein the method results in an increase in total brain and/or peripheral nervous system concentration and an increase in brain and/or peripheral nervous system-to-plasma partition ratio of the NPY analog as compared to using an alternative route of administration.

6. The method of claim 1, wherein the target organ or system is a brain and/or peripheral nervous system of the subject.

7. The method of claim 1, wherein the subject is suffering from or diagnosed with PTSD.

8. The method of claim 1, wherein the treatment is interventional.

9. The method of claim 1, wherein the [D-His$^{26}$]-NPY is an agonist for the NPY receptor 1 subtype (Y1R).

10. The method of claim 1, wherein the administered [D-His$^{26}$]-NPY possesses an effective ness at a lower dose than NPY.

11. The method of claim 4, wherein the second antidepressant is ketamine.

12. A prophylactic method for preventing a stress related impairment selected from the group consisting of (i) depression; and (ii) post-traumatic stress disorder (PTSD) with one or more PTSD associated symptoms including anxiety, depression and impaired social interactions, said method comprising intranasal administration to the subject in need thereof of a therapeutically effective amount of a neuropep-

SEQUENCE LISTING

```
<160> NUMBER OF SEQ ID NOS: 1

<210> SEQ ID NO 1
<211> LENGTH: 36
<212> TYPE: PRT
<213> ORGANISM: Artificial Sequence
<220> FEATURE:
<223> OTHER INFORMATION: Synthetic: amino acid peptide of rat and human
      NPY
<220> FEATURE:
<221> NAME/KEY: misc_feature
<223> OTHER INFORMATION: C-terminal amide

<400> SEQUENCE: 1

Tyr Pro Ser Lys Pro Asp Asn Pro Gly Glu Asp Ala Pro Ala Glu Asp
1               5                   10                  15

Met Ala Arg Tyr Tyr Ser Ala Leu Arg His Tyr Ile Asn Leu Ile Thr
            20                  25                  30

Arg Gln Arg Tyr
        35
``` tide Y (NPY) analog wherein said NPY analog is [D-His$^{26}$]-NPY and wherein the subject in need thereof has been, or will be, subjected to traumatic stress.

13. The method of claim 12, wherein the [D-His$^{26}$] NPY is an agonist for the NPY receptor 1 subtype (Y1R).

14. The method of claim 12, wherein the administered [D-His$^{26}$]-NPY possesses an effectiveness at a lower dose than NPY.

* * * * *